(12) United States Patent  
Choi

(10) Patent No.: US 10,795,720 B2  
(45) Date of Patent: Oct. 6, 2020

(54) ELECTRONIC DEVICE FOR CONTROLLING APPLICATION AND OPERATION METHOD THEREOF

(71) Applicant: SAMSUNG ELECTRONICS CO., LTD., Suwon-si, Gyeonggi-do (KR)

(72) Inventor: Yeon-Kyu Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/073,446

(22) PCT Filed: Jan. 26, 2017

(86) PCT No.: PCT/KR2017/000959  
§ 371 (c)(1),  
(2) Date: Jul. 27, 2018

(87) PCT Pub. No.: WO2017/131469  
PCT Pub. Date: Aug. 3, 2017

(65) Prior Publication Data  
US 2019/0034222 A1 Jan. 31, 2019

(30) Foreign Application Priority Data  
Jan. 28, 2016 (KR) .................. 10-2016-0010931

(51) Int. Cl.  
*G06F 3/00* (2006.01)  
*G06F 9/48* (2006.01)  
(Continued)

(52) U.S. Cl.  
CPC ............. *G06F 9/485* (2013.01); *G06F 9/44* (2013.01); *G06F 9/48* (2013.01); *G06F 9/4818* (2013.01); *G06F 9/50* (2013.01)

(58) Field of Classification Search  
CPC ..................................................... G06F 9/54  
(Continued)

(56) References Cited

U.S. PATENT DOCUMENTS 8,717,371 B1 * 5/2014 Wyatt ..................... G06F 3/14  
345/502  
2002/0133533 A1 9/2002 Czajkowski et al.  
(Continued)

FOREIGN PATENT DOCUMENTS

JP 2003-015892 1/2003  
JP 2005-301791 10/2005  
(Continued)

OTHER PUBLICATIONS

Cathy McCann, A Dynamic Processor Allocation Policy for IViukiprogrammed Shared-Memory Multiprocessors. (Year: 1993).*  
(Continued)

*Primary Examiner* — Lechi Truong  
(74) *Attorney, Agent, or Firm* — Nixon & Vanderhye, P.C.

(57) ABSTRACT

An electronic device according to an embodiment of the present invention comprises: a memory for storing a list including information related to the termination of one or more first applications of a plurality of applications included in the electronic device; and a processor, wherein the processor executes one or more second applications of the plurality of applications, checks contextual information associated with the electronic device, and, if the contextual information satisfies a specified condition, determines whether to terminate at least one executed application of the one or more executed second applications.

10 Claims, 16 Drawing Sheets

(51) Int. Cl.
  *G06F 9/44* (2018.01)
  *G06F 9/50* (2006.01)
(58) Field of Classification Search
  USPC ........................................................ 719/310
  See application file for complete search history.

(56) References Cited

U.S. PATENT DOCUMENTS

| | | | |
|---|---|---|---|
| 2005/0034129 A1* | 2/2005 | Chew | G06F 9/44594 718/100 |
| 2005/0243760 A1 | 11/2005 | Yoshioka | |
| 2009/0113444 A1* | 4/2009 | Hackborn | G06F 9/461 719/312 |
| 2009/0158212 A1 | 6/2009 | Dykstra-Erickson et al. | |
| 2012/0131321 A1* | 5/2012 | Jitkoff | G06F 1/3203 713/2 |
| 2014/0007106 A1* | 1/2014 | Weksler | G06F 9/485 718/100 |
| 2014/0013331 A1* | 1/2014 | Noro | G06F 9/50 718/103 |
| 2014/0325518 A1 | 10/2014 | Kim et al. | |
| 2015/0186179 A1* | 7/2015 | Park | G06F 9/485 718/103 |

FOREIGN PATENT DOCUMENTS

| | | |
|---|---|---|
| JP | 2008-097425 | 4/2008 |
| JP | 2010-033386 | 2/2010 |
| KR | 10-2014-0127104 | 11/2014 |
| KR | 10-2015-0080859 | 7/2015 |

OTHER PUBLICATIONS

International Search Report for PCT/KR2017/000959 dated Apr. 19, 2017, with English Translation, 5 pages.
Written Opinion of the ISA for PCT/KR2017/000959 dated Apr. 19, 2017, 5 pages.
Hoffman "Why You Shouldn't Use a Task Killer on Android" howtogeek.com/127388/htg-explains-why-you-shouldnt-use-a-task-killer-on-android/, Sep. 26, 2016, 10 pages.
Lee "Why RAM Boosters and Task Killers Are Bad for Your Android" makeuseof.com/tag/ram-boosters-task-killers-bad-android, Jul. 9, 2014, 6 pages.
"Memory Management in Android" https://mobworld.wordpress.com/2010/07/05/memory-management-in-android/, Jul. 5, 2010, 6 pages.
"Android/Process", http://arabiannight.tistory.com/183, Jun. 30, 2012, 3 pages.
Petrosino, http://luca-petrosino.blogspot.kr/2011/02/android-stati-e-metodi-di-callback-per.html , Feb. 26, 2011, 4 pages.
"Core Data", http://qs4int.blogspot.kr/ , Jan. 24, 2013, 10 pages.
Goshen, "Multitasking in iOS—The Junction", slideshare.net/origoshen/tawkon-the-junction , Jul. 31, 2011, 30 pages.
"iOS UIViewController Lifecycle" https://rdkw.wordpress.com/2013/02/24/ios-uiviewcontroller-lifecycle/ , Feb. 24, 2013, 2 pages.

* cited by examiner

ELECTRONIC DEVICE FOR CONTROLLING APPLICATION AND OPERATION METHOD THEREOF

PRIORITY

This application is the U.S. national phase of International Application No. PCT/KR2017/000959 filed Jan. 26, 2017, which designated the U.S. and claims priority to KR Patent Application No. 10-2016-0010931 filed Jan. 28, 2016, the entire contents of each of which are hereby incorporated by reference.

TECHNICAL FIELD

Various embodiments of the present invention relate to electronic devices for controlling applications and methods for operating the same.

BACKGROUND

Portable terminals with smart features are recently in wide use. Users may run various applications on their portable terminals. Portable terminals may execute multiple applications in the background. The memory of the portable terminal may retain multiple applications.

When multiple applications are running in the background, the memory of the portable terminal may suffer from a storage shortage. The system of the portable terminal may terminate some of the background applications to secure an available space in the memory.

Conventionally, the portable terminal system closes the background applications from the earliest executed one to the latest regardless of the user's intent when a storage shortage occurs. This may cause an application to be terminated even when it is supposed to be re-run by the user.

The use of a third-party application to forcedly terminate the running application may significantly overload the system and waste the battery power.

Thus, a need exists for a way to be able to control running applications with the user's intent reflected when the portable terminal system secures an available space in the memory.

SUMMARY

According to various embodiments of the present invention, there may be provided an electronic device, and a method for operating the same, which control running applications based on a list containing priorities for terminating applications executed in the background by the user.

According to an embodiment of the present invention, an electronic device may comprise a memory configured to store a list including information related to a termination of one or more first applications among a plurality of applications included in the electronic device and a processor configured to run one or more second applications among the plurality of applications, identify context information related to the electronic device, and when the context information meets a designated condition, determine whether to terminate at least one of the one or more running second applications.

According to an embodiment of the present invention, a method for operating an electronic device may comprise generating a list including information related to a termination of one or more first applications among a plurality of applications included in the electronic device, identifying context information related to the electronic device, and when the context information meets a designated condition, determining whether to terminate at least one of one or more running second applications among the plurality of applications based on the list.

Advantageous Effects

According to an embodiment, an electronic device may provide a list for controlling applications executed on the electronic device and control the background running applications, with the user's intent reflected, thereby enhancing the usability of the electronic device.

DETAILED DESCRIPTION

Figure 1:
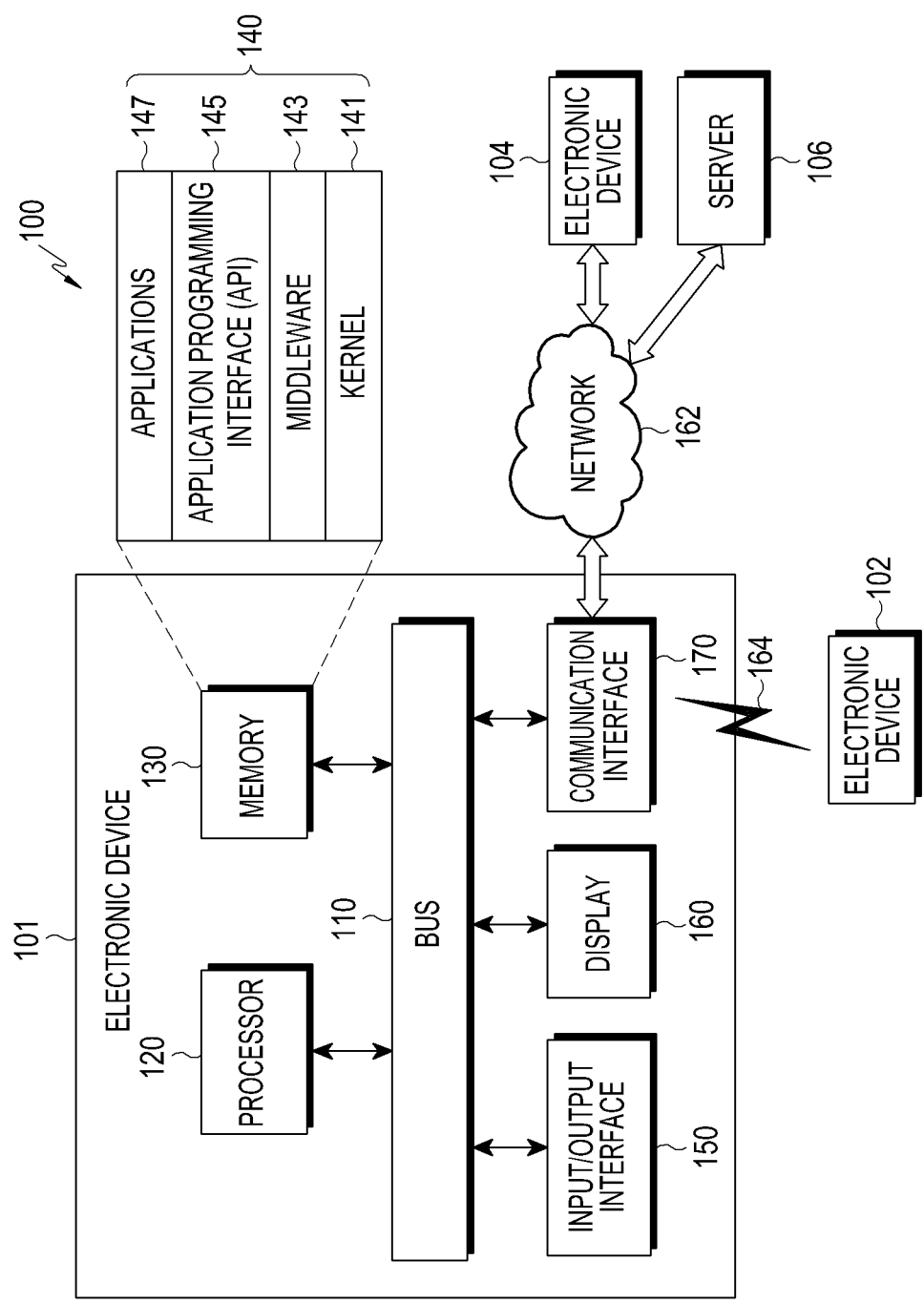
FIG. 1 is a block diagram illustrating an electronic device and a network according to various embodiments of the present invention.

Hereinafter, embodiments of the present disclosure are described with reference to the accompanying drawings.

However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to an embodiment of the present invention, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to other embodiments, the electronic device may include at least one of various medical devices (e.g., diverse portable medical measuring devices (a blood sugar measuring device, a heartbeat measuring device, or a body temperature measuring device), a magnetic resonance angiography (MRA) device, a magnetic resonance imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, an electricity or gas meter, a sprinkler, a fire alarm, a thermostat, a street light, a toaster, fitness equipment, a hot water tank, a heater, or a boiler).

According to some embodiments, examples of the electronic device may include at least one of part of a piece of furniture or building/structure, an electronic board, an electronic signature receiving device, a projector, or various measurement devices (e.g., devices for measuring water, electricity, gas, or electromagnetic waves). According to some embodiments, the electronic device may be one or a combination of the above-listed devices. According to some embodiments, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments. As used herein, the term "user" may denote a human or another device (e.g., an artificial intelligent electronic device) using the electronic device.

Referring to FIG. 1, according to various embodiments, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present invention, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using at least one system resources (e.g., the bus 110, processor 120, or memory 130) of electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 145 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, near-field communication (NFC), magnetic secure transmission (MST), or global navigation satellite system (GNSS). The GNSS may include at least one of, e.g., global positioning system (GPS), global navigation satellite system (Glonass), Beidou navigation satellite system (hereinafter, "Beidou") or Galileo, the European global satellite-based navigation system. Hereinafter, the terms "GPS" and the "GNSS" may be interchangeably used herein. The wired communication may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present invention, the server 106 may include a group of one or more servers. According to various embodiments, all or some of operations executed on the electronic device 101 may be executed on another or multiple other electronic devices (e.g., the electronic devices 102 and 104 or server 106). According to an embodiment of the present invention, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
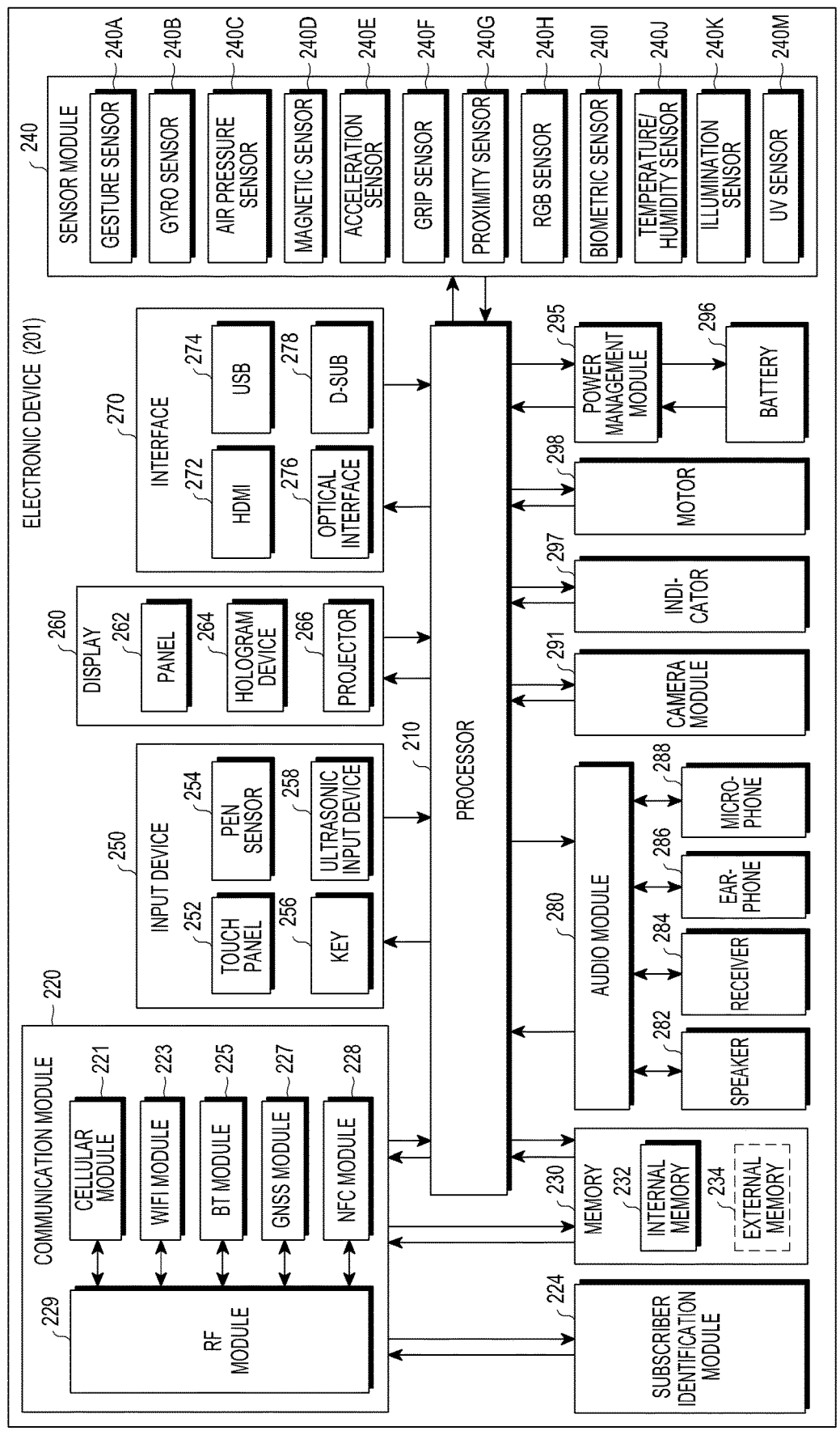
FIG. 2 is a block diagram illustrating an electronic device according to various embodiments of the present invention.

FIG. 2 is a block diagram (200) illustrating an electronic device 201 according to various embodiments. The electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a wireless fidelity (Wi-Fi) module 222, a bluetooth (BT) module 223, a GNSS module 224 (e.g., a GPS module, Glonass module, Beidou module, or Galileo module), a NFC module 225, an MST module 226, and a radio frequency (RF) module 227.

The cellular module 221 may provide, e.g., voice call, video call, text services, or internet services through a communication network. According to an embodiment, the cellular module 221 may perform identification or authentication on the electronic device 201 in the communication network using a subscriber identification module 229 (e.g., the SIM card). According to an embodiment, the cellular module 221 may perform at least some of the functions providable by the processor 210. According to an embodiment, the cellular module 221 may include a communication processor (CP).

Each of the Wi-Fi module 222, the bluetooth module 223, the GNSS module 224, the NFC module 225, or the MST module 226 may include a process for, e.g., processing data communicated through the module. According to some embodiments, at least some (e.g., two or more) of the cellular module 221, the Wi-Fi module 222, the bluetooth module 223, the GNSS module 224, the NFC module 225, or the MST module 226 may be included in a single integrated circuit (IC) or an IC package.

The RF module 227 may communicate data, e.g., communication signals (e.g., RF signals). The RF module 227 may include, e.g., a transceiver, a power amp module (PAM), a frequency filter, a low noise amplifier (LNA), or an antenna. According to other embodiments, at least one of the cellular module 221, the Wi-Fi module 222, the bluetooth module 223, the GNSS module 224, the NFC module 225, or the MST module 226 may communicate RF signals through a separate RF module.

The subscriber identification module 229 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included therein. According to some embodiments, the electronic device 201 may further include a processor configured to control the sensor 240 as part of the processor 210 or separately from the processor 210, and the electronic device 201 may control the sensor 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment, one or more image sensors (e.g., front and back sensors), a lens, an Image signal processor (ISP), or a flash such as an LED or xenon lamp.

The power manager module 295 may manage power of the electronic device 201, for example. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments may include at least one of the aforementioned components, omit some of them, or include other additional component(s). Some of the components may be combined into an entity, but the entity may perform the same functions as the components may do.

Figure 3:
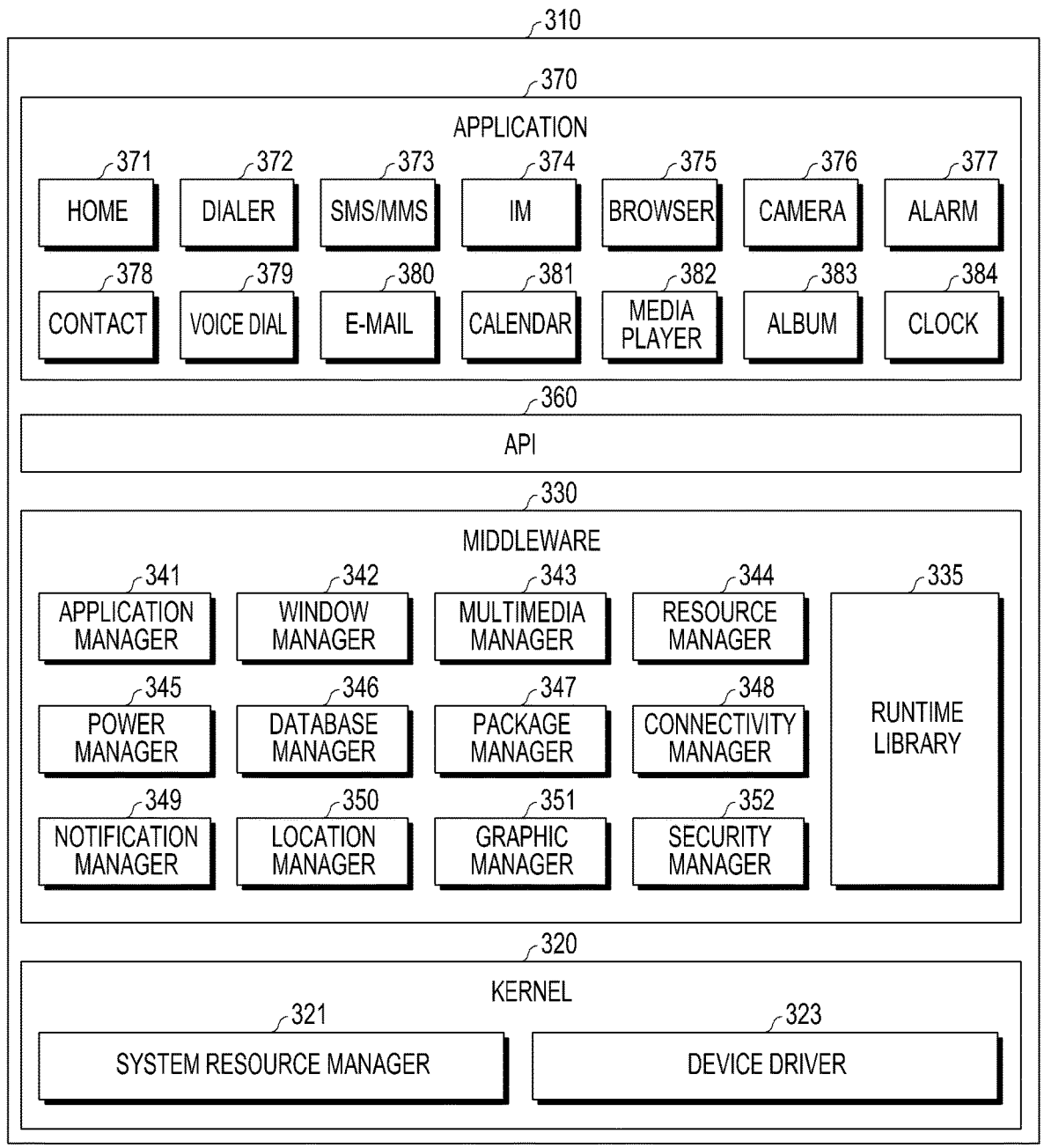
FIG. 3 is a block diagram illustrating a program module according to various embodiments of the present invention.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application program 147) driven on the operating system. The operating system may include, e.g., Android, iOS™, Windows, Symbian™, Tizen™, or Samsung Bada OS™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present invention, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphic user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. according to an embodiment, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provided a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment, the application 370 may include an application (e.g., a health-care application of a mobile medical device) designated according to an attribute of the external electronic device (e.g., the electronic devices 102 and 104). According to an embodiment of the present invention, the application 370 may include an application received from the external electronic device (e.g., the server 106 or electronic devices 102 and 104). According to an embodiment, the application 370 may include a preloaded application or a third-party application downloadable from a server. The names of the components of the program module 310 according to the shown embodiment may be varied depending on the type of operating system.

According to various embodiments, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

As used herein, "termination of application" may mean the operation of initializing the state information that the application retains or the operation of terminating (or forcedly terminating) the process of the application. "Termination of application" may mean the operation of returning resources secured by the application. For example, "termination of application" may mean the operation of turning the application into a destroyed state.

Figure 4:
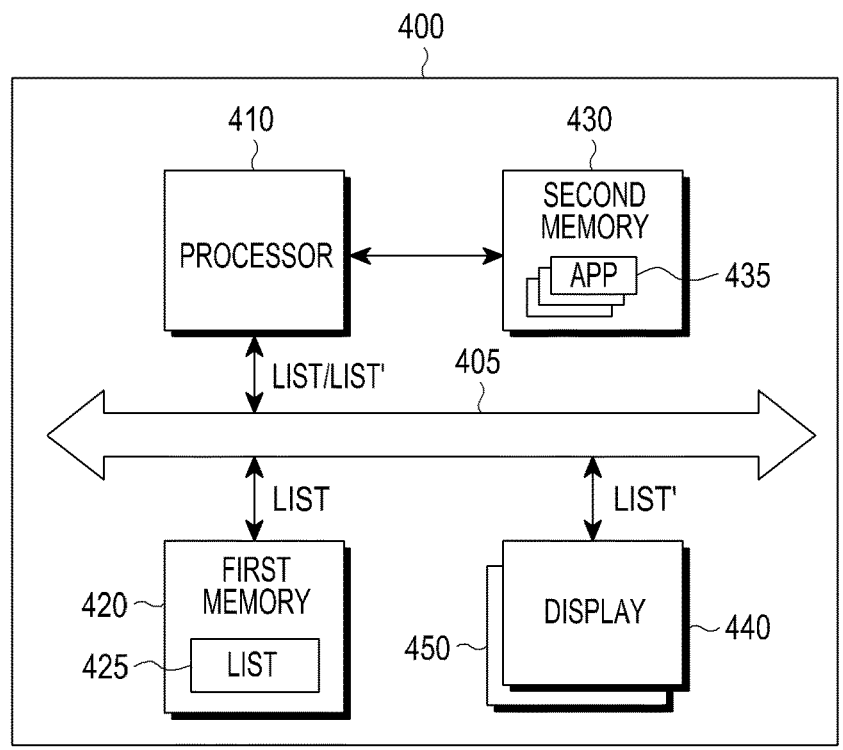
FIG. 4 is a block diagram schematically illustrating an electronic device according to an embodiment of the present invention.

FIG. 4 is a block diagram schematically illustrating an electronic device according to an embodiment of the present invention.

Referring to FIG. 4, an electronic device 400 may include a processor 410, a first memory 420, a second memory 430, a display 440, and a touchscreen 450.

Although FIG. 4 separately illustrates the first memory 420 and the second memory 430, the technical spirit of the present invention is not limited thereto, and the electronic device 400 may include a single memory.

The components 410, 420, 430, 440, and 450 of the electronic device 400 may transmit or receive data via a bus 405.

The electronic device 400 may have substantially the same or similar implementation as the electronic device 101 of FIG. 1 and the electronic device 201 of FIG. 2.

The processor 410 may control the overall operation of the electronic device.

According to an embodiment, the processor 410 may run at least one of a plurality of applications. Further, the processor 410 may run at least one of the plurality of applications in a background state.

The plurality of applications may mean applications included in the electronic device 400. For example, the plurality of applications may be stored in the first memory 420 of the electronic device 400.

The background state may mean a state in which at least one of the plurality of applications is not completely terminated but is stored in their prior running state. The background state may also mean a state in which at least one of the plurality of applications is running without the user's notice. Accordingly, the user may immediately start at least one background running application in its prior running state.

The processor 410 may store applications 435, which are executed in the background state, in the second memory 430. For example, the processor 410 may store information about the applications 435, which are executed in the background state, in the second memory 430.

The processor 410 may check the state of the second memory 430. For example, the processor 410 may periodically check the available capacity of the second memory 430. Further, if a new application runs, the processor 410 may check the available capacity of the second memory 430 for the new application.

According to an embodiment, where the available capacity of the second memory 430 is insufficient, the processor 410 may terminate the applications 435 running in the background to secure the available capacity.

According to an embodiment, where the available capacity of the second memory 430 is insufficient, the processor 410 may terminate the background running applications 435 by a last-seen-first-killed algorithm.

For example, the processor 410 may set the background running applications 435 into a destroyed state. Further, the processor 410 may set the background running applications 435 to be off-loaded from the second memory 430.

Meanwhile, unless the available capacity of the second memory 430 is insufficient, the processor 410 may set the state of the background running applications 435 as one of a paused state or stopped state. For example, the stopped state may mean a state in which the applications 435 are inactively operated without being displayed, and the paused state may mean a state in which the applications 435 are partially operated or displayed on the display 440 while being inactively operated.

Unless the available capacity of the second memory 430 is insufficient, the processor 410 may abstain from separately controlling the background running applications 435.

When the space of the second memory 430 to perform a new application is insufficient, the processor 410 may determine that the available capacity of the second memory 430 is insufficient. For example, where the resource capacity necessary to perform a new application is larger than the remaining capacity of the second memory 430, the processor 410 may determine that the available capacity of the second memory 430 is insufficient. Further, where the remaining capacity of the second memory 430 is a predetermined value or less, the processor 410 may determine that the available capacity of the second memory 430 is insufficient. The predetermined value may be set by the processor 410 or the user.

The processor 410 may receive a list LIST from the first memory 420 and terminate the background running applications 435 based on the list LIST.

According to an embodiment, where the available capacity of the second memory 430 is insufficient, the processor 410 may terminate the background running applications 435 by a last-seen-first-killed algorithm, based on the list LIST.

The list LIST may mean information about non-terminated application(s) among the background running applications 435. For example, when the available capacity of the second memory 430 is insufficient, the processor 410 may first terminate applications, that are not included in the list LIST, among the background running applications 435.

According to an embodiment, the processor 410 may terminate the applications not included in the list LIST in the order from the earliest to the latest. For example, the processor 410 may first terminate the earliest application stored in the volatile memory 130 among the applications not included in the list LIST.

The list LIST may be generated by the user or automatically by the processor 410. The list LIST may be modified by the user or automatically by the processor 410.

The processor 410 may store the generated (or modified) list LIST in the first memory 420.

The list LIST may include priority information about the application that is supposed to be terminated latest among the background running applications 435.

The priority information means information about the priorities of the applications that the processor 410 is to terminate when terminating the background running applications 435. For example, the priority information may include priorities corresponding to the plurality of applications.

According to an embodiment, the processor 410 may terminate an application with a first priority later than an application with a second priority. Further, the processor 410 may terminate an application with a third priority earlier than the application with the second priority.

The first memory 420 may store a plurality of applications included in the electronic device 400. Further, the first memory 420 may store the list LIST. For example, the first memory 420 may store the list LIST generated by the user or automatically generated by the processor 410.

According to an embodiment, the first memory 420 may store the list LIST in a separate storage area 425.

The first memory 420 may transmit the list LIST to the processor 410 under the control of the processor 410. For example, when the processor 410 terminates the background running applications 435, the first memory 420 may transmit the list LIST to the processor 410.

The first memory 420 may be implemented as a non-volatile memory. For example, the first memory 420 may be implemented as a flash memory.

The second memory 430 may store loaded applications among the plurality of applications included in the electronic device 400. Further, the second memory 430 may store applications executed by the processor 410.

According to an embodiment, the second memory 430 may store the background running applications 435.

According to an embodiment, the second memory 430 may be implemented as a non-volatile memory or volatile memory. For example, the volatile memory may be implemented as a DRAM or SRAM.

The display 440 may receive data processed from the processor 410 and display the received data. Further, the display 440 may display a user interface (UI). For example, the display 440 may display the list LIST or a GUI including the list LIST.

The touchscreen 450 may receive the user's touch input. The touchscreen 450 may be implemented to contact the display 440. Further, the touchscreen 450 and the display 440 may be implemented in a single device.

According to an embodiment, the user may generate the list LIST using the touchscreen 450. For example, the touchscreen 450 may receive a user input (e.g., a touch) on the GUI displayed on the display 440. The processor 410 may generate the list LIST based on the user input received through the touchscreen 450.

The touchscreen 450 may transmit information LIST' about the list to the processor 410 under the control of the processor 410. For example, the touchscreen 450 may transmit the information LIST' about the entered list to the processor 410 to store the list LIST generated by the user in the first memory 420.

Although FIG. 4 illustrates the touchscreen 450 as a means to receive the user's input, the technical spirit of the present invention is not limited thereto, and the electronic device 400 may further include an input device in addition to the touchscreen 450. The input device may have substantially the same or similar implementation to the input device 250 of FIG. 2. For example, the user may generate (or modify) the list LIST using the input device.

Figure 5:
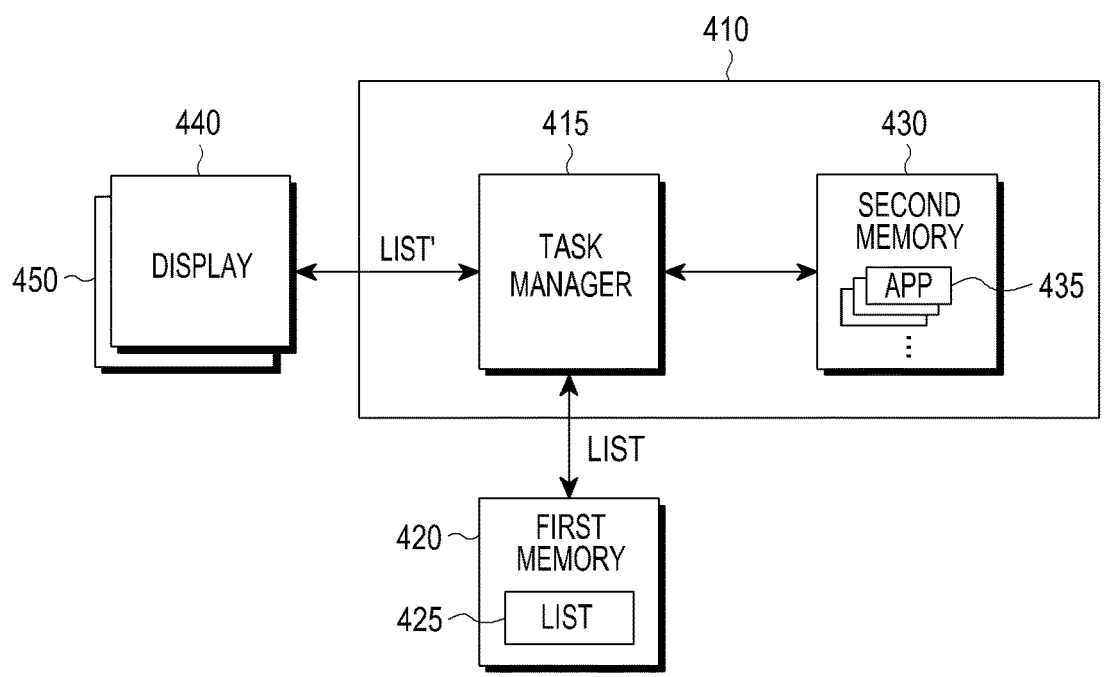
FIG. 5 is a block diagram illustrating operations of a processor according to various embodiments of the present invention.

FIG. 5 is a block diagram illustrating operations of a processor according to various embodiments of the present invention.

Referring to FIGS. 4 and 5, the processor 410 may execute a task manager 415.

Where the available capacity of the second memory 430 is insufficient, the task manager 415 may terminate the background running applications 435 based on the list LIST.

According to an embodiment, if the available capacity of the second memory 430 is insufficient when the application is executed (created) or operated (active), the task manager 415 may secure an available capacity in the second memory 430.

Where the available capacity of the second memory 430 is insufficient, the task manager 415 may terminate the background running applications 435 stored in the second memory 430.

For example, in the Android™ system, the task manager 415 may initialize all the state information about the application stored in the system service (or activity manager service). Or, the task manager 415 may terminate the process of the application.

The task manager 415 may generate the list LIST based on the information LIST' about the list entered through the touchscreen 450.

The task manager 415 may store the generated list LIST in the first memory 420.

Where the available capacity of the second memory 430 is insufficient, the task manager 415 may receive the list LIST from the first memory 420. The task manager 415 may terminate the background running applications 435 stored in the second memory 430 based on the list LIST.

Figure 6:
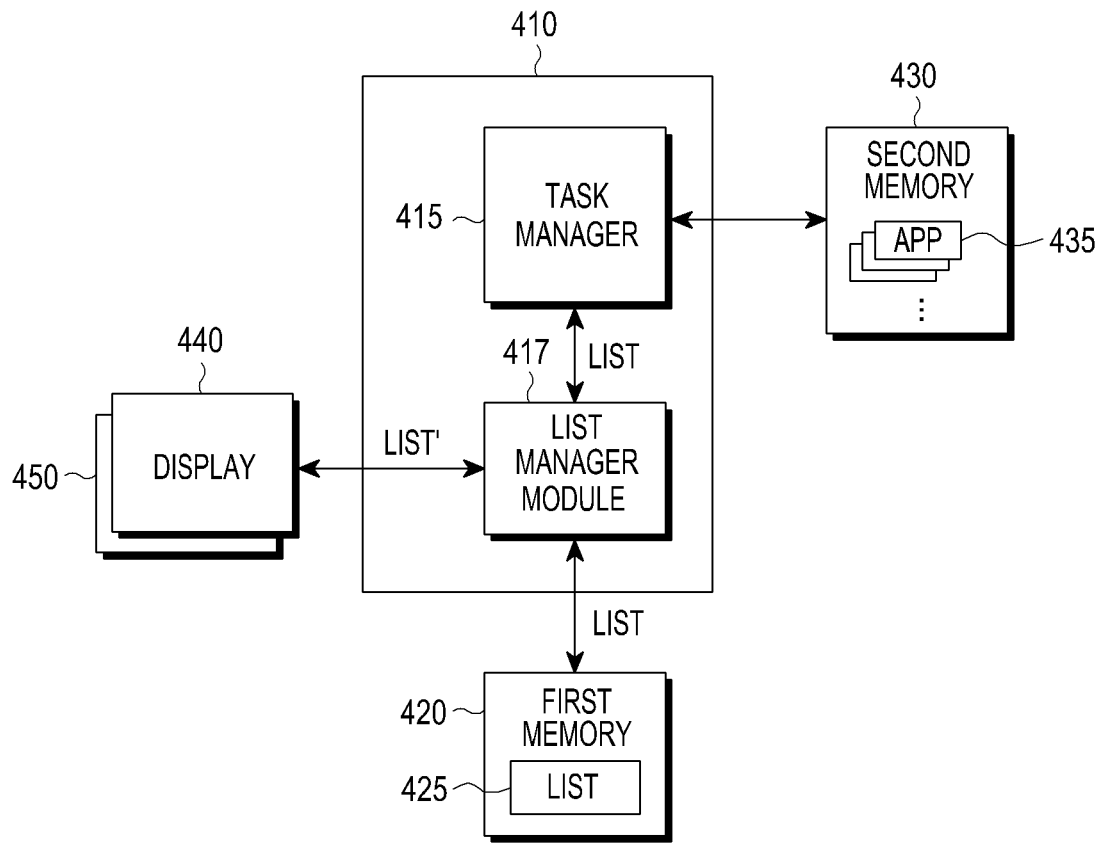
FIG. 6 is a block diagram illustrating operations of a processor according to various embodiments of the present invention.

FIG. 6 is a block diagram illustrating operations of a processor according to various embodiments of the present invention.

Referring to FIGS. 4 and 6, the processor 410 may execute the task manager 415 and a list manager module 417. FIG. 6 may be implemented in substantially the same or similar manner to FIG. 5 except for the list manager module 417.

Where the available capacity of the second memory 430 is insufficient, the task manager 415 may terminate the background running applications 435 based on the list LIST.

According to an embodiment, if the available capacity of the second memory 430 is insufficient when the application is executed (created) or operated (active), the task manager 415 may secure an available capacity in the second memory 430.

Where the available capacity of the second memory 430 is insufficient, the task manager 415 may terminate the background running applications 435 stored in the second memory 430.

The list manager module 417 may generate the list LIST based on the information LIST' about the list entered through the touchscreen 450.

The list manager module 417 may store the generated list LIST in the first memory 420.

Where the available capacity of the second memory 430 is insufficient, the list manager module 417 may receive the list LIST from the first memory 420. The list manager module 417 may transmit the list LIST to the task manager 415.

The task manager 415 may terminate the background running applications 435 stored in the second memory 430 based on the list LIST.

Figure 7:
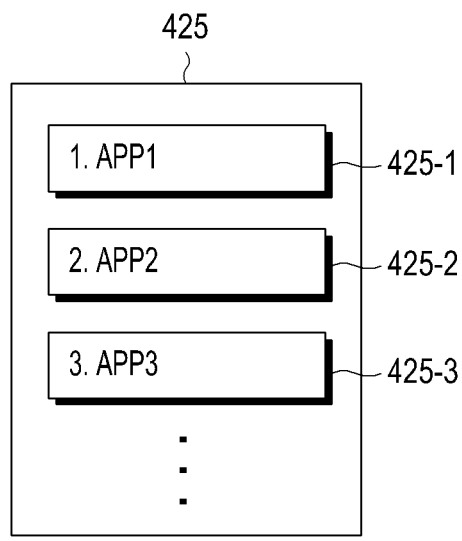
FIG. 7 is a block diagram schematically illustrating a list according to various embodiments of the present invention.

FIG. 7 is a block diagram schematically illustrating a list according to various embodiments of the present invention.

Referring to FIGS. 4 to 7, the first memory 420 may store the list LIST generated by the processor 410. Further, the first memory 420 may store the list LIST in a separate storage area 425.

According to an embodiment, the list LIST may include at least one application. For example, the list LIST may include a first application APP1, a second application, and a third application APP3.

The list LIST may also include priority information 425-1 to 425-N (where N is a natural number not less than two) about at least one application. For example, the list LIST may include a priority for the first application APP1, a priority for the second application APP2, and a priority for the third application APP3.

According to an embodiment, the processor 410 may set the first application APP1 to have the first priority 425-1, the second application APP2 to have the second priority 425-2, and the third application APP3 to have the third priority 425-3. At this time, the processor 410 may terminate the first application APP1, the second application APP2, and the third application APP3 according to the priorities 425-1 to 425-3.

The processor 410 may terminate the background running applications 435 based on the list LIST including the priority information 425-1 to 425-N.

For example, the processor 410 may first terminate the third application APP3 among the first application APP1 corresponding to the first priority 425-1, the second application APP2 corresponding to the second priority 425-2, and the third application APP3 corresponding to the third priority 425-3. Further, the processor 410 may first terminate the second application APP2 between the first application APP1 corresponding to the first priority 425-1 and the second application APP2 corresponding to the second priority 425-2.

According to various embodiments of the present invention, an electronic device may comprise a memory configured to store a list including information related to a termination of one or more first applications among a plurality of applications included in the electronic device and a processor configured to run one or more second applications among the plurality of applications, identify context information related to the electronic device, and when the context information meets a designated condition, determine whether to terminate at least one of the one or more running second applications.

The processor may be configured to terminate the at least one running application when the at least one running application is not included in the list and abstain from terminating the at least one running application when the at least one running application is included in the list.

The processor may identify a remaining space of the memory, and when the remaining space is a designated value or less, perform the identification.

The list may include priority information related to the one or more first applications, and when the context information meets the designated condition, the processor may be configured to terminate the at least one running application based on the priority information.

The context information may include an activation time, an activation count, or a size of the memory for the at least one running application, and the processor may be configured to identify whether the context information is included in a designated range.

The electronic device may further comprise an input device, and the processor may be configured to obtain a user input using the input device and generate or vary the list based on the user input.

The processor may be configured to set a state of the at least one running application as a paused state or a stopped state, as part of the abstaining and set the state of the at least one running application as a destroyed state, as part of the terminating.

The at least one running application may be set to be off-loaded from the memory, as part of setting as the destroyed state.

Figure 8A:
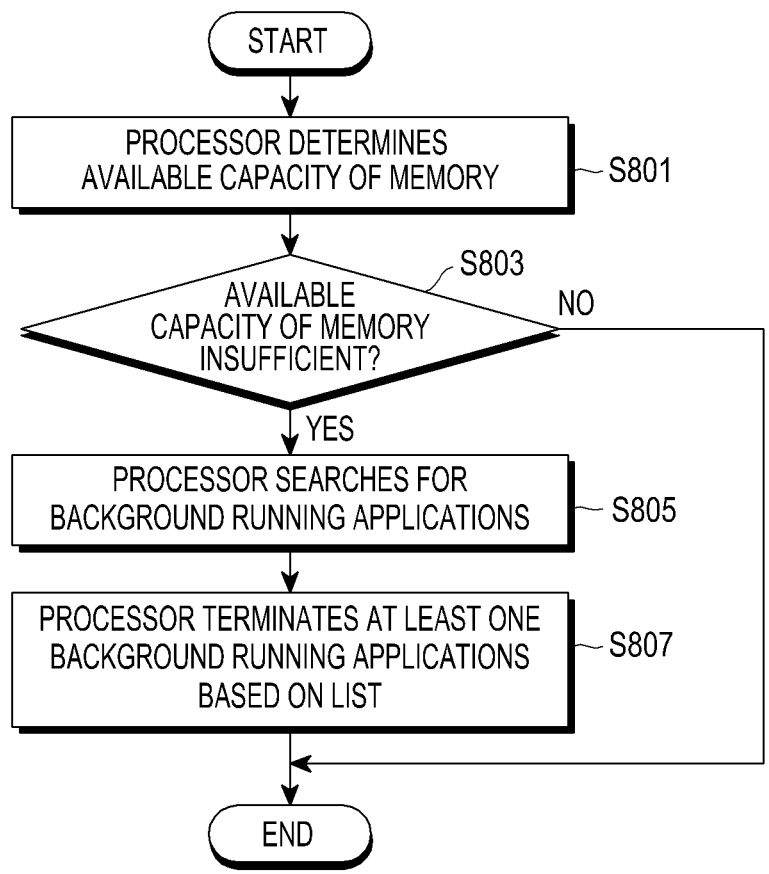
FIGS. 8A and 8B are flowcharts illustrating a method for operating an electronic device according to various embodiments of the present invention.
Figure 8B:
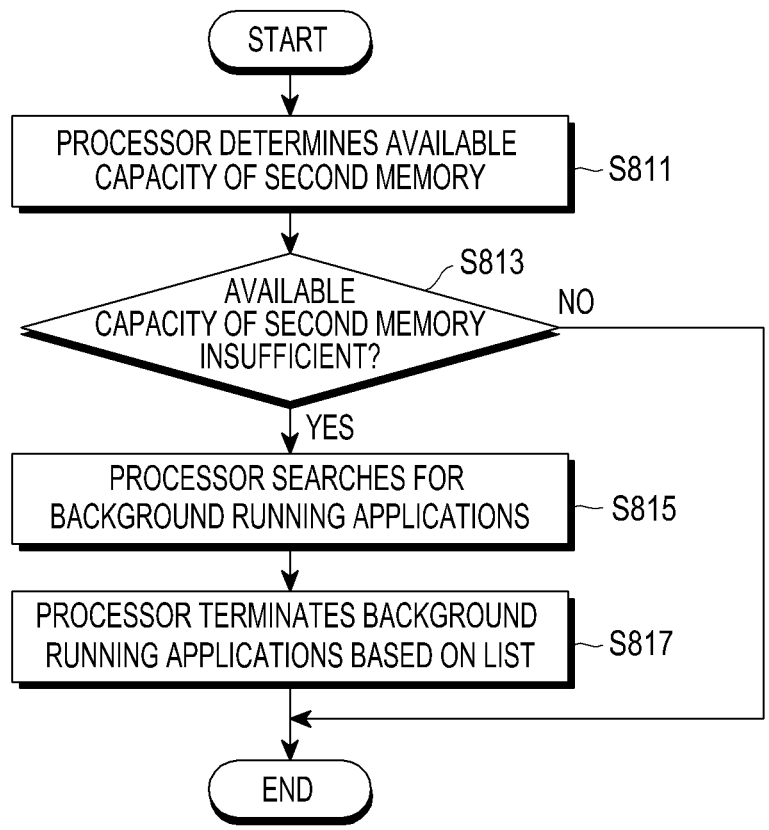

FIGS. 8a and 8b are flowcharts illustrating a method for operating an electronic device according to various embodiments of the present invention.

Referring to FIGS. 4 to 8a, the processor 410 may determine the available capacity of the memory 420 and/or 430 (S801). For example, the processor 410 may periodically determine the available capacity of the memory 420 and/or 430. Further, where at least one application is executed, the processor 410 may determine the available capacity for the application.

Upon determining that the available capacity of the memory 420 and/or 430 is insufficient (S803), the processor 410 may secure the available capacity of the memory 420 and/or 430 (YES of S803).

The processor 410 may search for background running applications 435 (S805). For example, the processor 410 may configure a list for the background running applications 435.

The processor 410 may receive the list LIST from the memory 420 and/or 430 to terminate the background running applications 435.

The processor 410 may terminate the background running applications 435 based on the list LIST (S807). For example, the processor 410 may compare applications included in the list LIST with the background running applications 435 and determine whether to terminate the background running applications 435 according to a result of the determination.

According to an embodiment, where the available capacity of the memory 420 and/or 430 is insufficient, the processor 410 may determine whether to terminate the background running applications 435 based on the list LIST by a last-seen-first-killed algorithm.

Referring to FIGS. 4 to 8b, the processor 410 may determine the available capacity of the second memory 430 (S811). For example, the processor 410 may periodically determine the available capacity of the second memory 430. Further, where at least one application is executed, the processor 410 may determine the available capacity for the application.

According to an embodiment, the second memory 430 may be implemented as a volatile memory. For example, the volatile memory may be implemented as a DRAM.

Upon determining that the available capacity of the second memory 430 is insufficient (S813), the processor 410 may secure the available capacity of the second memory 430 (YES of S813).

On the other hand, upon determining that the available capacity of the second memory 430 is sufficient (NO of S813), the processor 410 may periodically or in real-time monitor the available capacity of the second memory 430.

The processor 410 may search for background running applications 435 (S815). For example, the processor 410 may configure a list for the background running applications 435.

The processor 410 may receive the list LIST from the first memory 420 to terminate the background running applications 435.

The processor 410 may terminate the background running applications 435 based on the list LIST (S817). For example, the processor 410 may compare applications included in the list LIST with the background running applications 435 and determine whether to terminate the background running applications 435 according to a result of the determination.

According to an embodiment, where the available capacity of the second memory 430 is insufficient, the processor 410 may determine whether to terminate the background running applications 435 by a last-seen-first-killed algorithm, based on the list LIST.

Figure 9:
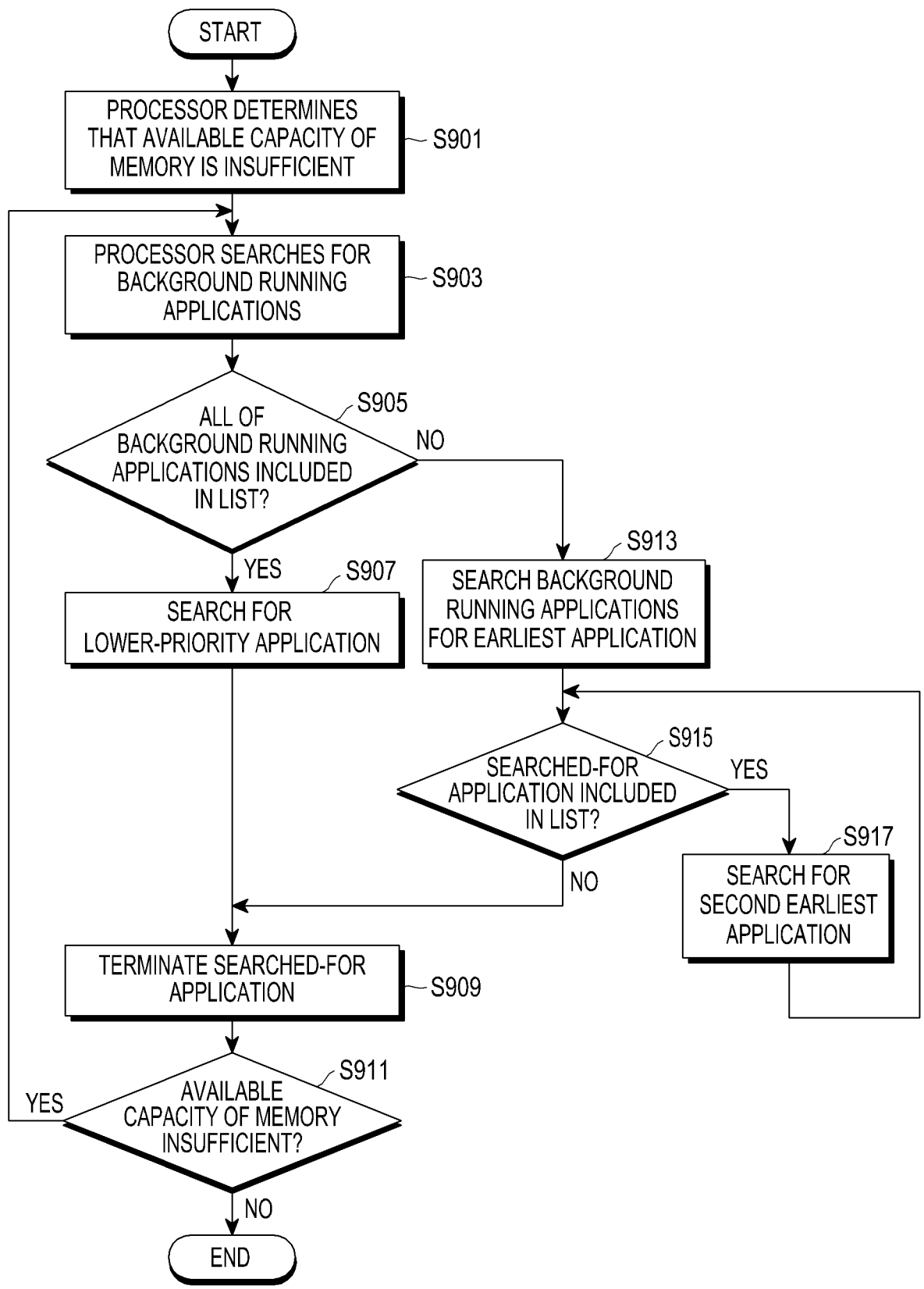
FIG. 9 is a flowchart illustrating a method for controlling an application by a processor according to various embodiments of the present invention.

FIG. 9 is a flowchart illustrating a method for controlling an application by a processor according to various embodiments of the present invention.

Referring to FIGS. 4 to 9, upon determining that the available capacity of the memory 420 or 430 is insufficient (S901), the processor 410 may secure the available capacity of the memory 420 or 430.

According to an embodiment, the memory 420 or 430 may be implemented as a volatile memory or non-volatile memory. For example, the volatile memory may be implemented as a DRAM, and the non-volatile memory may be implemented as a flash memory.

The processor 410 may search for background running applications 435 (S903).

The processor 410 may receive the list LIST from the first memory 420 to terminate the background running applications 435.

The processor 410 may determine whether all of the background running applications 435 are included in the list LIST (S905).

If all of the background running applications 435 are included in the list LIST (YES of S905), the processor 410 may search the list LIST for an application with a lower priority (S907).

The processor 410 may terminate the application searched for (S909).

For example, in the Android system, the task manager 415 may transmit a stop signal to the framework to terminate the application searched for. In response to the stop signal, the application state information stored in the system service of the framework may be initialized. Further, in response to the stop signal, the application process of the framework may be terminated.

The processor 410 may determine whether the available capacity of the memory 420 or 430 is insufficient (S911). For example, to run at least one application, the processor 410 may check the available capacity of the memory 420 or 430 and determine whether the available capacity is insufficient.

Where the available capacity of the memory 420 or 430 is insufficient, the processor 410 may additionally terminate the background running applications 435.

If not all of the background running applications 435 are included in the list LIST (NO of S905), the processor 410 may search the background running applications 435 for the earliest application (S913). The earliest application here may mean the application that was stored earliest in the memory 420 or 430.

The processor 410 may determine whether the application searched for is included in the list LIST (S915).

Unless the application searched for is included in the list LIST (NO of S915), the processor 410 may terminate the searched-for application (S909).

Where the application searched for is included in the list LIST (YES of S915), the processor 410 may search for the second earliest application (S917).

The processor 410 may determine whether the second earliest application searched for is included in the list LIST (S915). Unless the second earliest application searched for is included in the list LIST, the processor 410 may terminate the searched-for second earliest application. Where the second earliest application searched for is included in the list LIST (YES of S915), the processor 410 may search for the third earliest application (S917).

Figure 10:
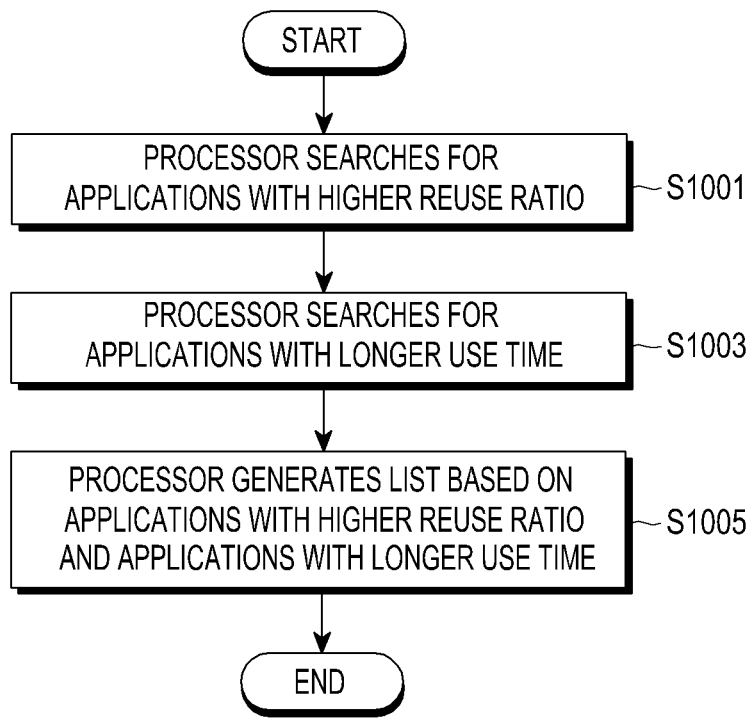
FIG. 10 is a flowchart illustrating a method for setting a list by a processor according to various embodiments of the present invention.

FIG. 10 is a flowchart illustrating a method for setting a list by a processor according to various embodiments of the present invention.

Referring to FIGS. 4 to 10, the processor 410 may automatically set the list LIST. At this time, the processor 410 may set the list LIST based on the activation time and count of at least one application.

For example, the processor 410 may set the list LIST based on the execution pattern of the at least one application and the use pattern of the at least one application.

According to an embodiment, the processor 410 may search for applications with a higher reuse ratio (S1001). For example, the applications with a higher reuse ratio may mean applications that are rerun within a shorter time after being terminated. The processor 410 may search for the applications with a higher reuse ratio based on the use pattern of at least one application.

According to an embodiment, the processor 410 may search for the applications with a longer use time (S1003). For example, the applications with a longer use time may mean applications that run longer between the time of execution and the time of termination. The processor 410 may search for the applications with a longer use time based on the use pattern of at least one application.

The processor 410 may generate the list LIST based on the applications with a higher reuse ratio and the applications with a longer use time (S1005). Further, the processor 410 may generate priority information based on the applications with a higher reuse ratio and the applications with a longer use time.

The processor 410 may store the priority information-containing list LIST in the first memory 420.

Figure 11:
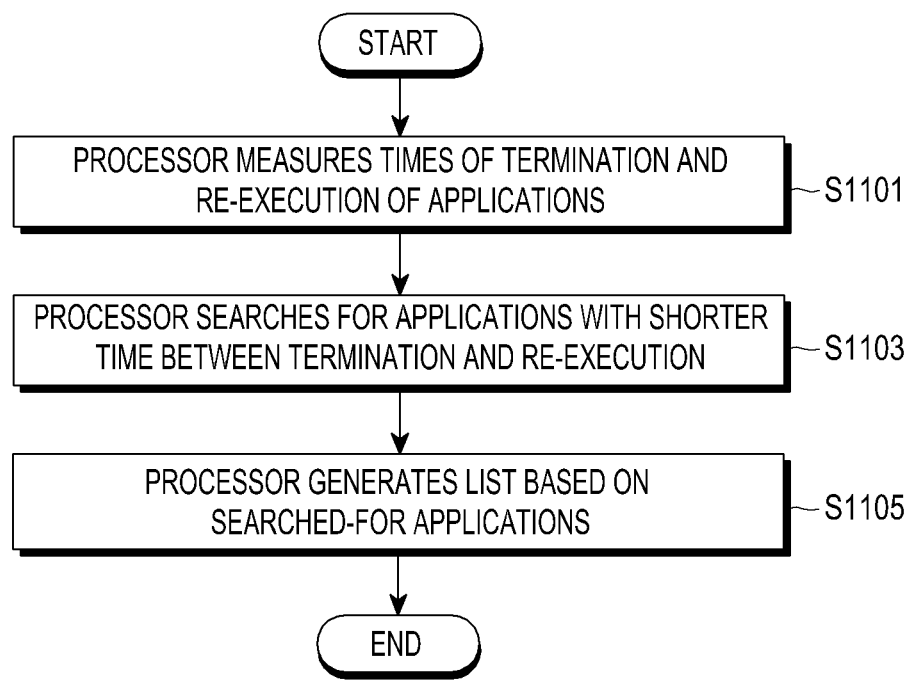
FIG. 11 is a flowchart illustrating a method for setting a list by a processor according to various embodiments of the present invention.

FIG. 11 is a flowchart illustrating a method for setting a list by a processor according to various embodiments of the present invention.

Referring to FIGS. 4 to 11, the processor 410 may automatically set the list LIST. At this time, the processor 410 may set the list LIST based on the execution pattern of the user's at least one application and the use pattern of the at least one application.

According to an embodiment, the processor 410 may search for applications with a higher reuse ratio. The processor 410 may measure the times of termination and re-execution of at least one application (S1101). For example, the processor 410 may measure the times of termination (or forced termination) and re-execution of at least one application. The processor 410 may measure the time taken for reuse using the times of termination and re-execution of at least one application.

The processor 410 may search for applications with a shorter time between the termination and re-execution (S1103).

The processor 410 may generate the list LIST based on the applications searched for (S1105). The processor 410 may generate priority information based on the applications searched for.

Figure 12:
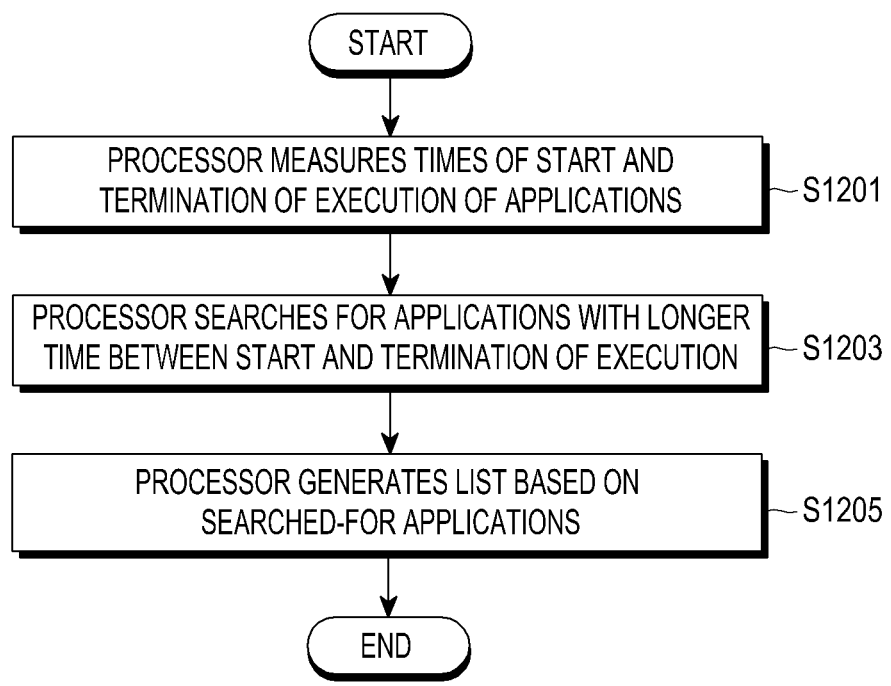
FIG. 12 is a flowchart illustrating a method for setting a list by a processor according to various embodiments of the present invention.

FIG. 12 is a flowchart illustrating a method for setting a list by a processor according to various embodiments of the present invention.

Referring to FIGS. 4 to 12, the processor 410 may automatically set the list LIST. At this time, the processor 410 may set the list LIST based on the execution pattern of the user's at least one application and the use pattern of the at least one application.

According to an embodiment, the processor 410 may search for the applications with a longer use time. The processor 410 may measure the times of execution and termination of at least one application (S1201). For example, the processor 410 may measure the times of execution and termination (or forced termination) of at least one application. The processor 410 may measure the use time using the difference in time between the execution and termination of at least one application.

The processor 410 may search for applications with a longer time between the execution and termination of at least one application (S1203).

The processor 410 may generate the list LIST based on the applications searched for. The processor 410 may generate priority information based on the applications searched for.

The operations of the methods of processes shown in FIGS. 8 to 12 may be executed in a sequential, parallel, or heuristic manner. For example, the operations of the methods of processes shown in FIGS. 8 to 12 may be performed in a different order, or some of the operations may be omitted, or other operations may be added thereto.

According to various embodiments of the present invention, a method for operating an electronic device may comprise generating a list including information related to a termination of one or more first applications among a plurality of applications included in the electronic device, identifying context information related to the electronic device, and when the context information meets a designated condition, determining whether to terminate at least one of one or more running second applications among the plurality of applications based on the list.

Determining whether to terminate the at least one running application may include terminating the at least one running application when the at least one running application is not included in the list and abstain from terminating the at least one running application when the at least one running application is included in the list.

Identifying the context information related to the electronic device may include identifying a remaining space of the memory, and when the remaining space is a designated value or less, identifying the context information related to the electronic device.

The list may include priority information related to the one or more first applications, and determining whether to terminate the at least one running application may include terminating the at least one running application based on the priority information.

The context information may include an activation time, an activation count, or a size of a memory for the at least one running application, and identifying the context information related to the electronic device may include identifying whether the context information is included in a designated range.

Generating the list may include obtaining an input signal from a user using an input device and generating or varying the list based on the input signal.

Abstaining from terminating the at least one running application may include setting a state of the at least one running application as a paused state or a stopped state, and terminating the at least one running application may include setting the state of the at least one running application as a destroyed state.

Setting as the destroyed state may include setting the at least one running application to be off-loaded from the memory.

The number of the lists shown in FIGS. 13 to 17 is set for ease of description, and the technical spirit of the present invention is not limited thereto.

Figure 13:
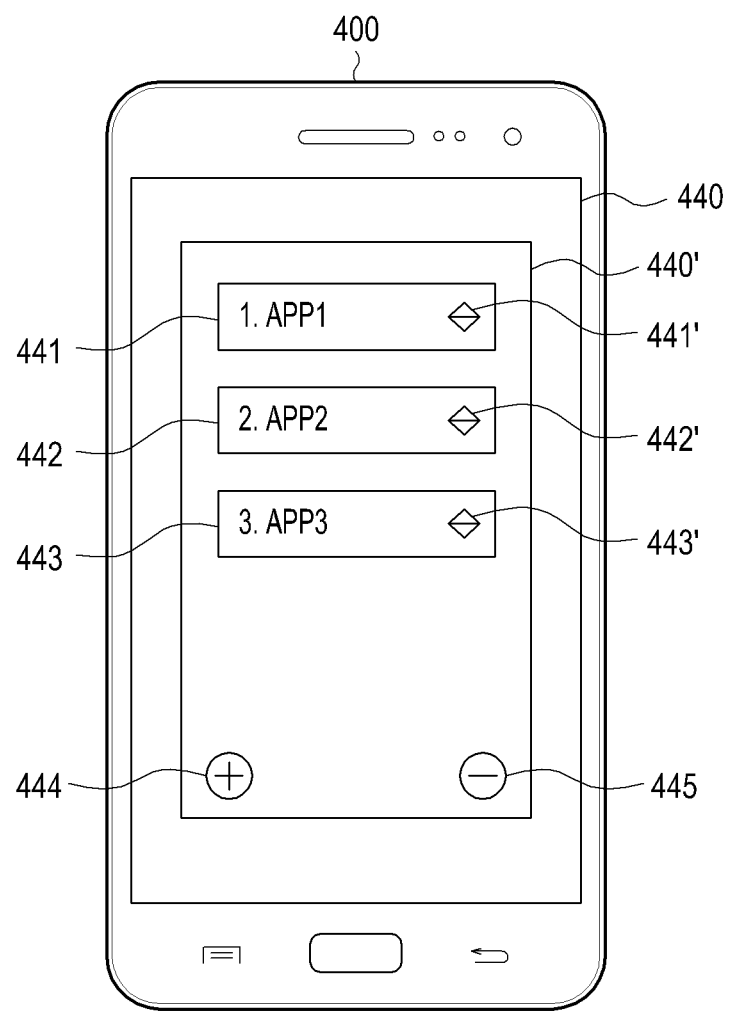
FIG. 13 illustrates a user interface for a method for setting a list by a user according to various embodiments of the present invention.

FIG. 13 illustrates a graphic user interface (GUI) for a method for setting a list by a user according to various embodiments of the present invention.

Referring to FIGS. 4 to 13, the processor 410 may display a GUI 440' for the list LIST through the display 440. The user may generate or modify the list LIST through the touchscreen 450.

The GUI 440' for the list LIST may include a first list 441, a second list 442, a third list 443, a list add key 444, and a list delete key 445.

The first list 441, the second list 442, and the third list 443 may include their respective corresponding applications APP1, APP2, and APP3. For example, the first list 441 may include the first application APP1, the second list 442 may include the second application APP2, and the third list 443 may include the third application APP3.

According to an embodiment, the first list 441, the second list 442, and the third list 443 may include priority information. For example, the first list 441, the second list 442, and the third list 443 may have a first priority, a second priority, and a third priority, respectively. In other words, the processor 410 may latest terminate the first application APP1 corresponding to the first list 441 among the background running applications 435.

The first list 441, the second list 442, and the third list 443 may include weight change keys 441', 441', and 443', respectively. The user may change the weights (or priorities) for the applications APP1, APP2, and APP3 respectively corresponding to the first list 441, the second list 442, and the third list 443 using the weight change keys 441', 442', and 443'.

The list add key 444 may mean a key for adding lists. According to an embodiment, the user may add lists using the list add key 444. For example, the user may generate a fourth list (not shown) in addition to the first list 441, the second list 442, and the third list 443 using the list add key 444 (e.g., by touching the list add key 444).

The list delete key 445 may mean a key for deleting lists. According to an embodiment, the user may delete lists using the list delete key 445. For example, the user may delete at least one of the first list 441, the second list 442, and the third list 443 using the list delete key 445 (e.g., by touching the list delete key 445).

Figure 14:
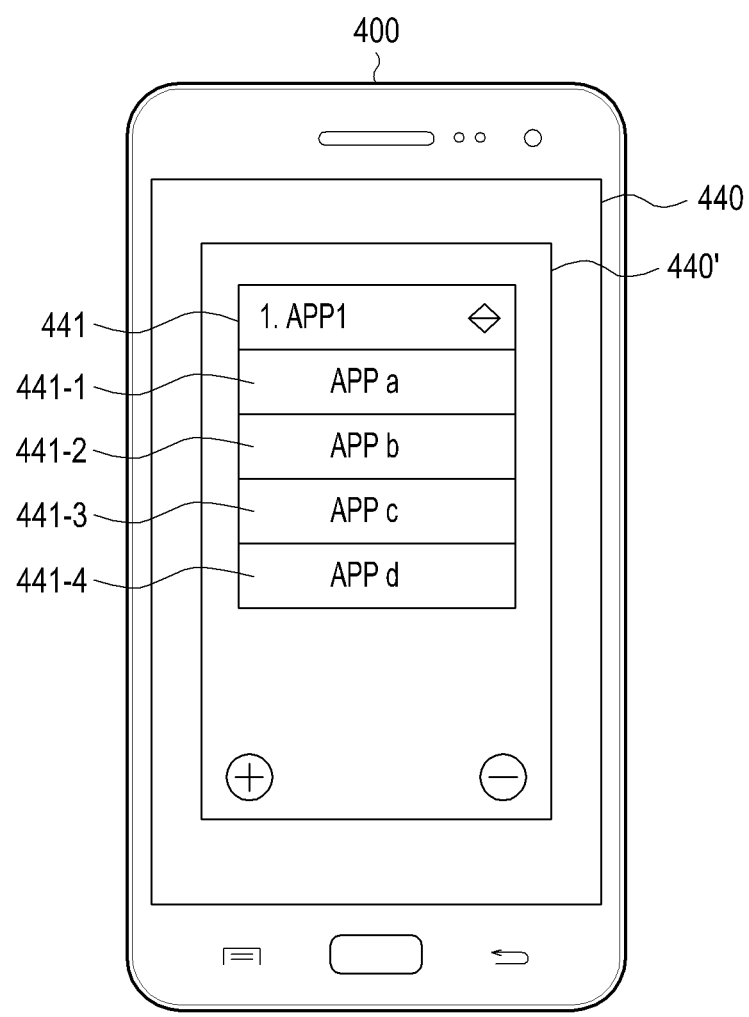
FIG. 14 illustrates a user interface for a method for setting a list by a user according to various embodiments of the present invention.

FIG. 14 illustrates a graphic user interface (GUI) for a method for setting a list by a user according to various embodiments of the present invention.

Referring to FIGS. 4 to 14, the processor 410 may display a GUI 440' for the list LIST through the display 440. The user may generate or modify the list LIST through the touchscreen 450.

The user may touch the first list 441 on the touchscreen 450 to select the application corresponding to the first list 441.

The GUI 440' may provide list selection items 441-1 to 441-4 to select the application corresponding to the first list 441. For example, when the user touches the first list 441, the GUI 440' may provide the list selection items 441-1 to 441-4 for the first list 441. At this time, the list selection items 441-1 to 441-4 may provide at least one of a plurality of applications stored in the first memory 420.

According to an embodiment, the user may touch the first list 441 and select the application corresponding to the first list 441 among the plurality of applications APPa, APPb, APPc, and APPd stored in the first memory 420.

Likewise, the user may touch the second list 442 and select the application corresponding to the second list 442 among the plurality of applications APPa, APPb, APPc, and APPd stored in the first memory 420, and the user may touch the third list 443 and select the application corresponding to the third list 443 among the plurality of applications APPa, APPb, APPc, and APPd stored in the first memory 420.

Figure 15:
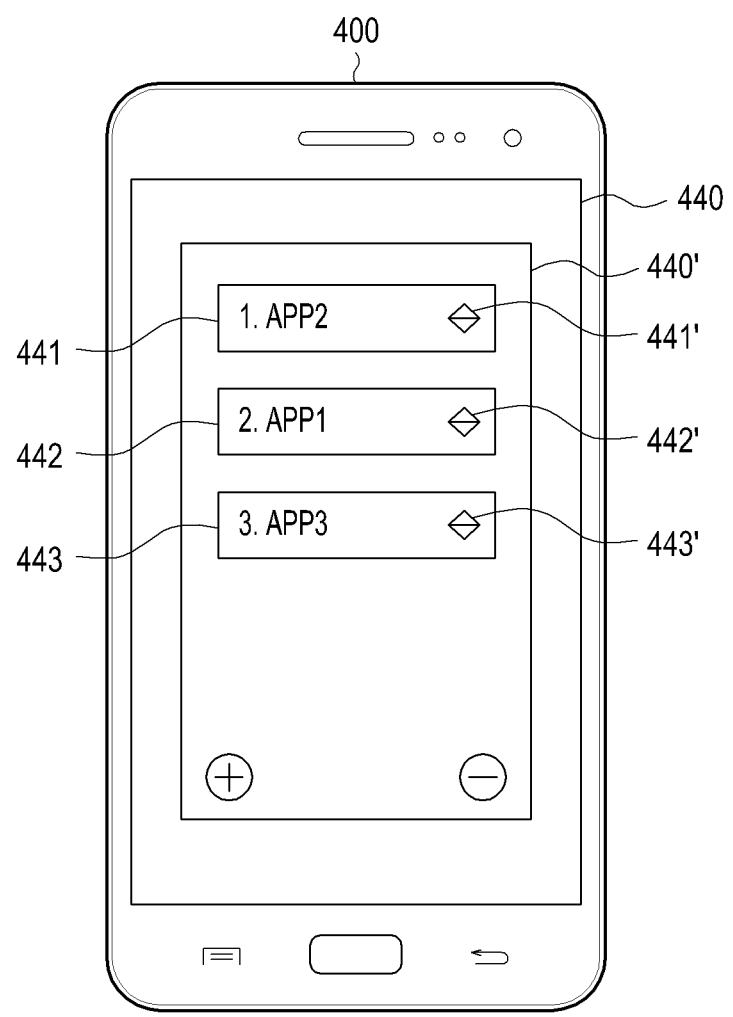
FIG. 15 illustrates a user interface for a method for setting a list by a user according to various embodiments of the present invention.

FIG. 15 illustrates a graphic user interface (GUI) for a method for setting a list by a user according to various embodiments of the present invention.

Referring to FIGS. 4 to 15, the processor 410 may generate or modify the list LIST in response to the user's touching the GUI 440'.

According to an embodiment, the user may vary the priority of the first application APP1 corresponding to the first list 441 using the first weight change key 441', the priority of the second application APP2 corresponding to the second list 442 using the second weight change key 442', and the priority of the third application APP3 corresponding to the third list 443 using the third weight change key 443'.

For example, the user may change the priority of the second application APP2 corresponding to the second list 442 to the first priority by touching the second weight change key 442'. That is, the user may change the second application APP2 corresponding to the second list 442 into the first list 441 by touching the second weight change key 442'.

Further, the user may change the priority of the first application APP1 corresponding to the first list 441 to the second priority by touching the first weight change key 441'. That is, the user may change the first application APP1 corresponding to the first list 441 into the second list 442 by touching the first weight change key 441'.

Figure 16:
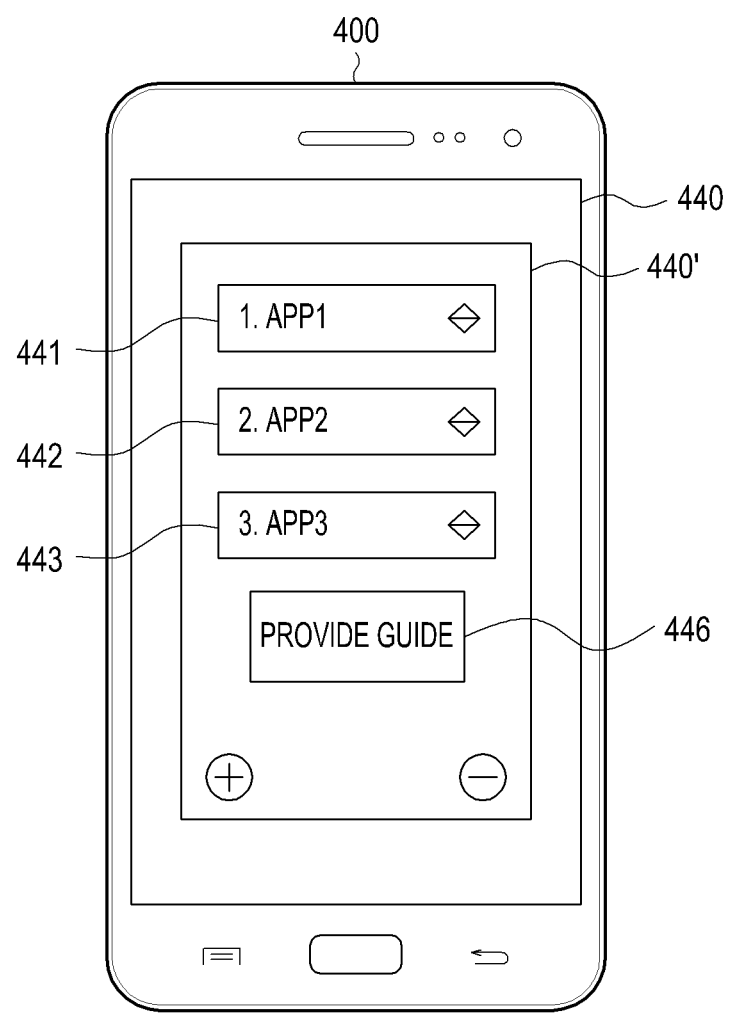
FIG. 16 illustrates a user interface for a method for setting a list by a user according to various embodiments of the present invention.

FIG. 16 illustrates a graphic user interface (GUI) for a method for setting a list by a user according to various embodiments of the present invention.

Referring to FIGS. 4 to 16, the processor 410 may generate or modify the list LIST in response to the user's touching the GUI 440'.

The GUI 440' may provide a guide for the list automatically generated by the processor 410. For example, the guide for the list may be popped up.

According to an embodiment, the GUI 440' may further include a provide guide key 466. When the user selects the provide guide key 466, the processor 410 may provide a guide for a list automatically generated. For example, the provide guide key 466 may be popped up. In other words, where the user generates or modifies the list LIST, the processor 410 may enable the provide guide key 466 to pop up. The user may touch the provide guide key 466 to receive a guide for the list automatically generated by the processor 410.

At this time, generating the guide for the list by the processor 410 may be implemented by the method described above in connection with FIGS. 10 to 12.

Figure 17:
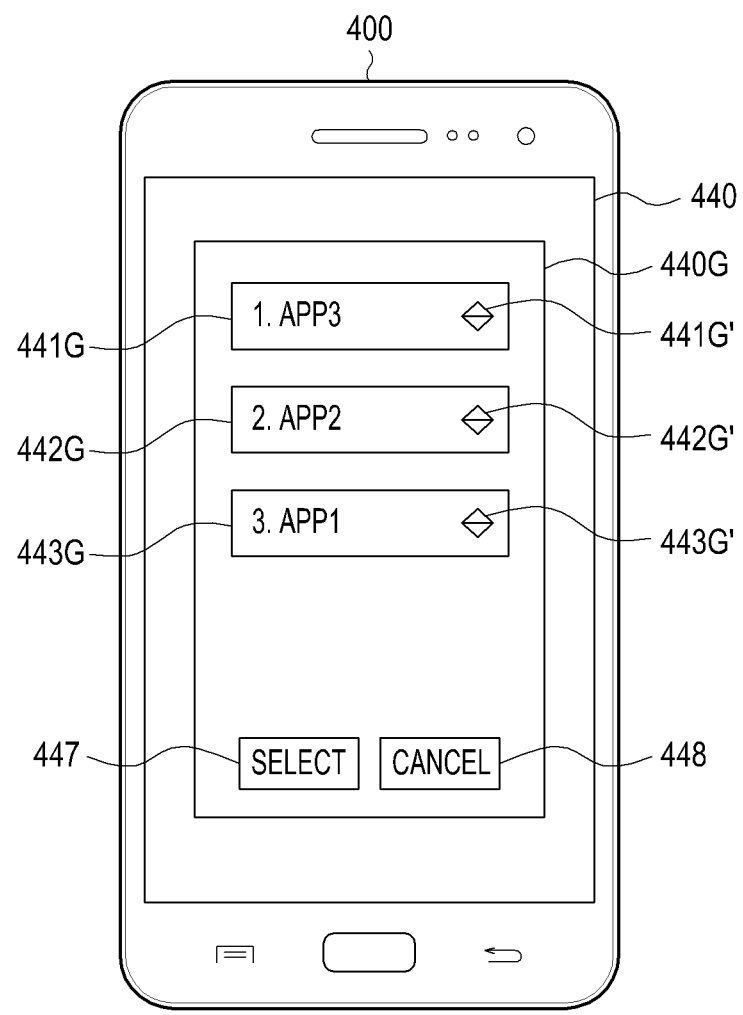
FIG. 17 illustrates a user interface for a method for setting a list by a user according to various embodiments of the present invention.

FIG. 17 illustrates a graphic user interface (GUI) for a method for setting a list by a user according to various embodiments of the present invention.

Referring to FIGS. 4 to 17, the processor 410 may generate or modify the list LIST in response to the user's touching the GUI 440'.

The processor 410 may generate the list LIST based on the application use pattern. Further, the processor 410 may generate a guide for the list based on the application use pattern.

The display 440 may display a guide 440G for the list under the control of the processor 410.

According to an embodiment, when the user selects the provide guide key 466, the processor 410 may provide the guide 440G for the list automatically generated. For example, the guide 440G for the list may be popped up in response to the user's touch input.

The guide 440G for the list may include lists generated by the processor 410.

According to an embodiment, the guide 440G for the list may include a first guide list 441G, a second guide list 442G, a third guide list 443G, a select key 447, and a cancel key 448.

The first guide list 441G, the second guide list 442G, and the third guide list 443G may include their respective corresponding applications APP1, APP2, and APP3. For example, the first guide list 441G, the second guide list 442G, and the third guide list 443G may include the third application APP3, the second application APP2, and the first application APP1, respectively.

According to an embodiment, the first guide list 441G, the second guide list 442G, and the third guide list 443G may include priority information. For example, the first guide list 441G, the second guide list 442G, and the third guide list 443G may include a first priority, a second priority, and a third priority, respectively.

The first guide list 441G, the second guide list 442G, and the third guide list 443G may include weight change keys 441G', 442G', and 443G', respectively. For example, the user may vary the weights (or priorities) for the applications APP1, APP2, and APP3 respectively corresponding to the first guide list 441G, the second guide list 442G, and the third guide list 443G using the weight change keys 441G', 442G', and 443G'.

The select key 447 may mean a key indicating to select the list LIST as the list contained in the list guide 440G. For example, when the user touches the select key 447, the processor 410 may set the list included in the list guide 440G as the list LIST.

The cancel key 448 may mean a key indicating not to select the list LIST as the list contained in the list guide. For example, when the user touches the cancel key 448, the processor 410 may abstain from setting the list included in the list guide 440G as the list LIST. At this time, the processor 410 may provide the guide 440G for a new list.

The list guide 440G may further include an add list key and a delete list key. The add list key and the delete list key may be implemented in substantially the same or similar manner to that described in connection with FIG. 13.

The GUI 440', the list guide 440G, and their components shown in FIGS. 13 to 17 are intended for purposes of illustration, and the technical spirit of the present invention is not limited thereto. That is, the GUI 440' and the list guide 440G may add other components, and the positions, arrangement, and/or number of the components are not limited thereto.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present invention, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic media (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary various embodiments, and vice versa.

According to various embodiments, there is provided a storage medium storing commands configured to be executed by at least one processor to enable the at least one processor to perform at least one operation that may comprise generating a list including information related to a termination of one or more first applications among a plurality of applications included in an electronic device, identifying context information related to the electronic device, and when the context information meets a designated condition, determining whether to terminate at least one of one or more running second applications among the plurality of applications based on the list.

Modules or programming modules in accordance with various embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present invention. Accordingly, the scope of the present invention should be interpreted as including all changes or various embodiments based on the technical spirit of the present invention.

Each of the aforementioned components of the electronic device may include one or more parts, and a name of the part may vary with a type of the electronic device. The electronic device in accordance with various embodiments may include at least one of the aforementioned components, omit some of them, or include other additional component(s). Some of the components may be combined into an entity, but the entity may perform the same functions as the components may do.

The embodiments disclosed herein are proposed for description and understanding of the disclosed technology and does not limit the scope of the present invention. Accordingly, the scope of the present invention should be interpreted as including all changes or various embodiments based on the technical spirit of the present invention.

The invention claimed is:

1. An electronic device, comprising:
a first memory;
a second memory; and a processor configured to:
identify, based on input for running a first application stored in the first memory, whether resources of the second memory are sufficient for the first application; obtain a list from the first memory to terminate at least one application among a plurality of applications which are currently running in a background of the electronic device, based on identifying that the resources of the second memory are insufficient, wherein the list is generated based on information related to prior executions and prior terminations of applications stored in the first memory; identify for termination, based on identifying that the resources are insufficient, the at least ones application which is currently running in the background of the electronic device; and control to terminate running of the at least one application, wherein the identifying of the at least one application for termination comprises: determining whether all of the plurality of applications currently running in the background of the electronic device are included in the list; based on determining that all of the plurality of applications are included in the list, applying a first criterion to identify, as the at least one application for termination, at least one of the plurality of applications included in the list; and based on determining that not all of the plurality of applications are included in the list, applying a second criterion different from the first criterion to identify, as the at least one application for termination, at least one of the plurality of applications not included in the list;
wherein the processor is configured to identify whether a remaining space of the second memory is less than or equal to a designated value.

2. The electronic device of claim 1, wherein an application included in list has a priority for termination that is later than an application not included in the list.

3. The electronic device of claim 1, further comprising an input device, wherein the processor is configured to obtain a user input from the input device and vary the list based on the user input.

4. The electronic device of claim 1, wherein the processor is configured to control to pause, as part of the terminating, based on identifying that the resources are insufficient for running the first application, operation of the at least one application.

5. The electronic device of claim 1, wherein the processor is configured to control to off-load, as part of the terminating, the at least one application from the second memory.

6. A method for operating an electronic device, the method comprising:
Identifying, based on input for running a first application stored in a first memory of the electronic device, whether resources of a second memory of the electronic device are sufficient for the first application;
obtaining a list from the first memory to terminate at least one application among a plurality of applications which are running in a background of the electronic device, based on identifying that the resources of the second memory are insufficient, wherein the list is generated based on information related to prior executions and prior terminations of applications stored in the first memory;
identifying for termination based on identifying that the resources are insufficient, the at least ones application which is currently running in a-background of the electronic device; and terminating running of the at least one application, wherein the identifying of the at least one application for termination comprises: determining whether all of the plurality of applications currently running in the background of the electronic device are included in the list; based on determining that all of the plurality of applications are included in the list, applying a first criterion to identify, as the at least one application for termination, at least one of the plurality of applications included in the list; and based on determining that not all of the plurality of applications are included in the list, applying a second criterion different from the first criterion to identify, as the at least one application for termination, at least one of the plurality of applications not included in the list;
wherein the processor is configured to identify whether a remaining space of the second memory is less than or equal to a designated value.

7. The method of claim 6, wherein the identifying of whether the resources are sufficient comprises identifying whether a remaining space of the second memory is less than or equal to a designated value.

8. The method of claim 6, wherein an application included in the list has a priority for termination that is later than an application not included in the list.

9. The method of claim 6, further comprising obtaining an input signal from a user using an input device and varying the list based on the input signal.

10. The method of claim 6, further comprising controlling to terminate the at least one application comprises pausing or stopping operation of the at least one application.

* * * * *